March 13, 1951 — T. A. TISCHLER — 2,544,739

MECHANICAL BUTTER DISPENSING MACHINE

Filed May 12, 1948 — 3 Sheets-Sheet 2

INVENTOR.
Thomas A. Tischler
BY
Barthel & Bugbee
ATTYS

March 13, 1951  T. A. TISCHLER  2,544,739
MECHANICAL BUTTER DISPENSING MACHINE
Filed May 12, 1948  3 Sheets-Sheet 3
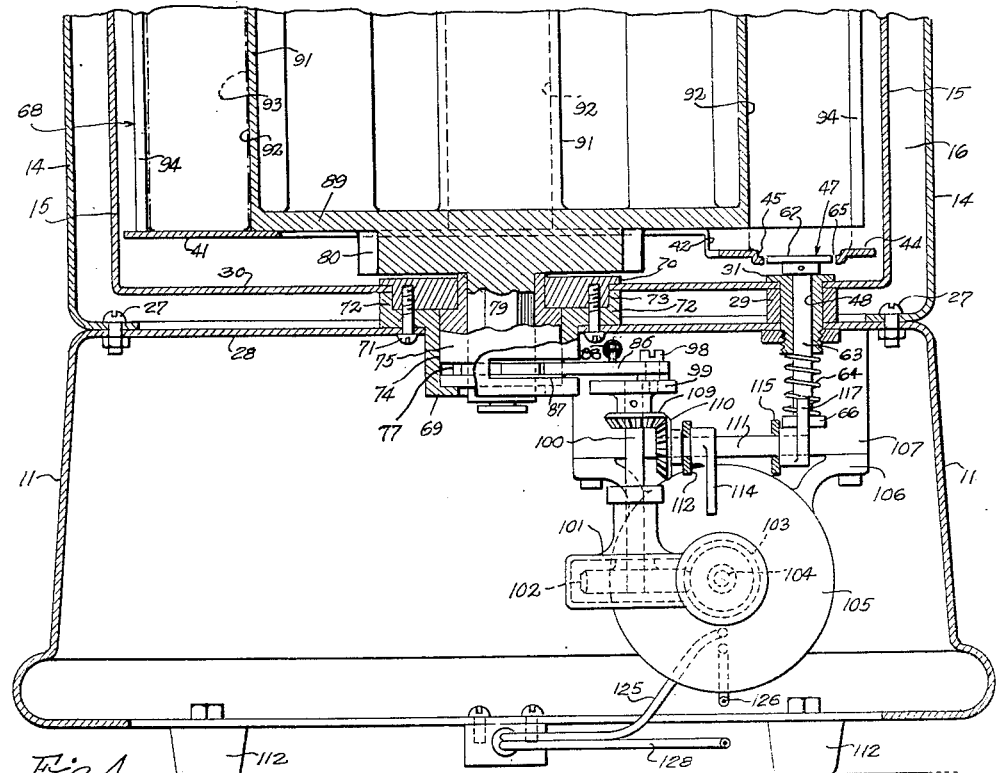
Fig. 4.
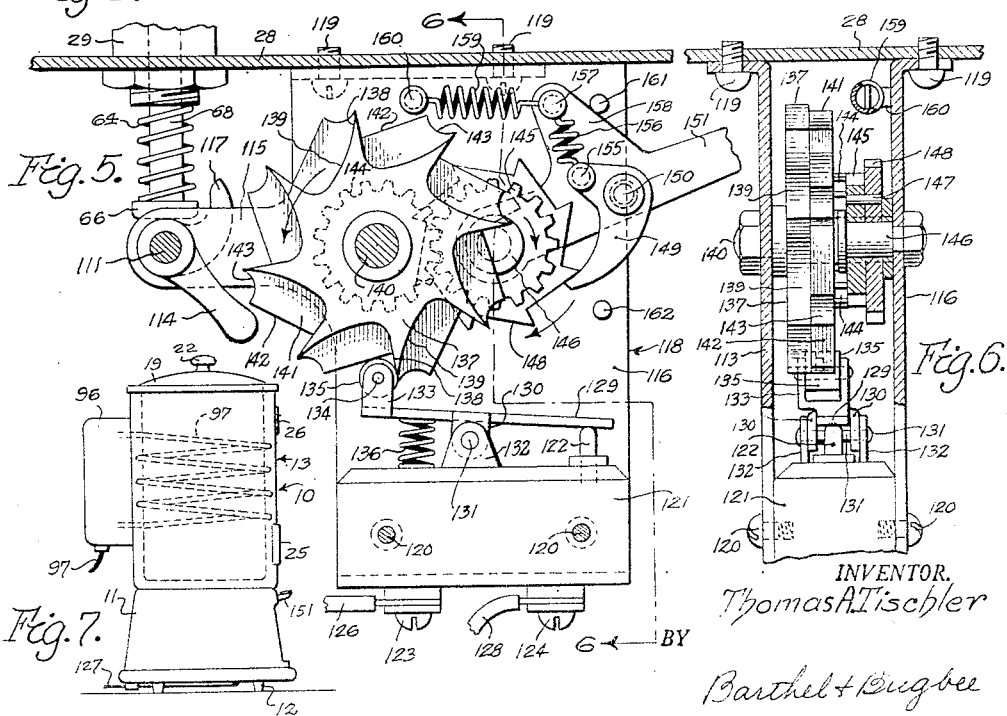
Fig. 5.
Fig. 6.
Fig. 7.
INVENTOR.
Thomas A. Tischler
BY
Barthel + Bugbee
ATTYS Patented Mar. 13, 1951

2,544,739

UNITED STATES PATENT OFFICE 2,544,739

MECHANICAL BUTTER DISPENSING MACHINE

Thomas A. Tischler, Detroit, Mich.

Application May 12, 1948, Serial No. 26,613

8 Claims. (Cl. 31—21)

This invention relates to dispensing machines and, in particular, to machines for dispensing butter or other materials of similar consistency.

One object of this invention is to provide a machine for dispensing butter or other materials of similar consistency, wherein automatic mechanism is provided for slicing off and delivering one pat of butter in a given time period in response to the actuation of an operating member, such as a lever or button, regardless of how many times the operating member may be moved during that time period.

Another object is to provide a machine for dispensing butter in which the butter is held in a rotary magazine or hopper containing elongated blocks of so-called "prints" of butter, the actuating mechanism causing the magazine to be rotated past a cutter which slices off a pat and delivers it to the operator of the machine.

Another object is to provide a machine for dispensing butter which will rapidly dispense uniform pats of butter from such elongated blocks or prints without any need for care on the part of the operator, thereby adapting the machine for use in restaurants, hotels, and other places where pats of butter are required in large quantities.

Another object is to provide a machine for dispensing butter wherein the machine during its cycle of operation impresses an insigne or design on the bottom of each print of butter prior to the slicing off of a pat, so that each pat is marked with a distinctive design, such as the name of the restaurant or hotel or the brand of the butter.

Another object is to provide a machine for dispensing butter wherein a rotary magazine in a series of peripheral vertical chutes carries a number of elongated blocks or prints of butter and wherein other spare prints thereof are stored in the central space in the magazine, means being preferably provided for maintaining the magazine at such a temperature that the butter is of the proper consistency to be sliced off into pats and delivered to the user.

Another object is to provide a machine for dispensing butter, as set forth in the preceding objects, wherein the rotary magazine is rotated step-by-step through a plurality of stations by power-operated mechanism, the bottom of each block or print of butter being impressed with a design at one station and a pat bearing this design sliced off at a subsequent station and dropped through a delivery chute or opening.

In the drawings:

Figure 4 is a central vertical section through the lower portion of the machine, taken along the line 4—4 in Figure 2 substantially at right angles to the view shown in Figure 1;

Figure 5 is an enlarged fragmentary side elevation of the control mechanism for the machine with the parts in the positions they occupy immediately after the starting lever has been depressed and released but before the driving motor has started operating;

Figure 6 is a vertical section along the line 6—6 in Figure 5; and

Figure 7 is a miniature side elevation of the machine as a whole, showing a refrigerating unit attached to the rear thereof and connected to a cooling coil in the hollow walls of the machine.

General construction

In general, the butter dispensing machine of this invention consists of a housing or casing having a double-walled upper chamber and a lower chamber. Rotatably mounted in the upper chamber is a rotary magazine having vertical feed chutes arranged at intervals around its periphery and of such dimensions as to slidably receive elongated blocks or "prints" of butter in sizes in which butter is commonly sold, such as quarter-pound prints. The magazine is rotated step-by-step by motor-driven mechanism past an upwardly-moving plunger which marks a design on the bottom of each print of butter. Further rotation of the magazine carries the bottom portion of each print of butter past a horizontal slicing wire stretched across a delivery opening in such a manner that the motion of the magazine over the delivery opening causes an imprinted pat of butter to be sliced off the bottom of the print. The pat of butter thus detached from the print, drops onto a suitable platform or receiver or into the hands of the operator, as desired.

The magazine is rotated step-by-step and indexed from station-to-station by an electric motor which moves its output shaft a predetermined number of revolutions and then halts. The energization of the motor is controlled by an operating lever coupled by pawl and ratchet mechanism to control mechanism which closes an electric switch, the latter in turn energizing the driving motor. This mechanism is so constructed and arranged that even if the operator depresses the operating lever several times in quick succession, the driving motor still causes the magazine to rotate through but a single cycle to detach but a single pat of butter. By this arrangement it is thus possible to jam the mechanism or cause it to slice off imperfect pats of butter. The operator thus has the power only to start the cycle of operations, but cannot thereafter interfere with it until the cycle has run its course.

Housing construction

Figure 1:
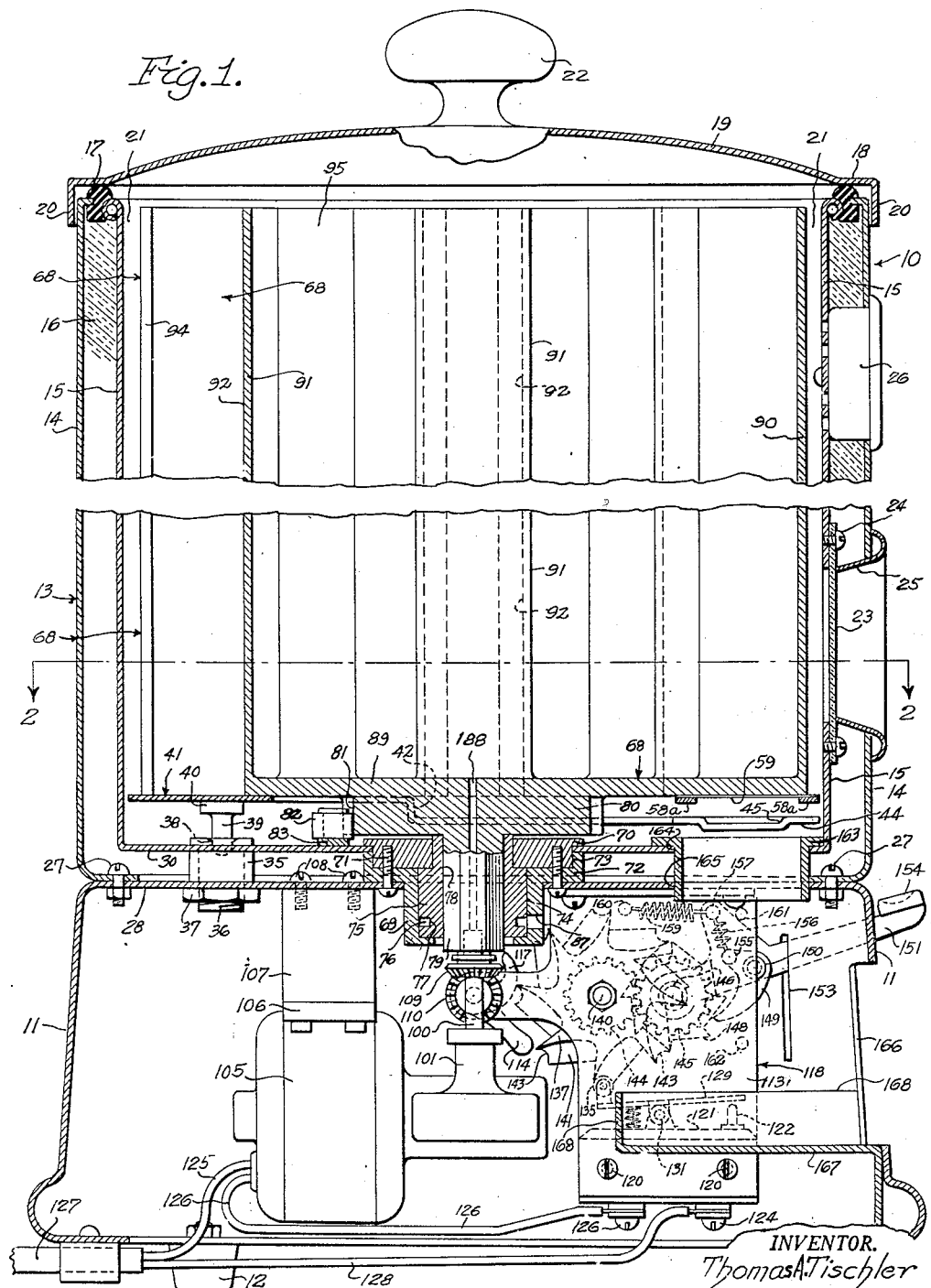
Figure 1 is a central vertical section through a butter dispensing machine according to a preferred form of the invention, taken along the line 1—1 in Figure 2, the parts being in their neutral positions immediately after the completion of an operating cycle.

Referring to the drawings in detail, Figures 1 and 7 show a butter dispensing machine generally designated 10 as including a hollow approximately cylindrical base housing or casing 11 supported by feet 12 of rubber or the like and in turn carrying a double-walled upper casing 13 with spaced outer and inner concentric walls or containers 14 and 15 having insulation 16 arranged in the annular space between the walls 14 and 15. An annular gasket 17 insulates the two walls from one another at the top thereof, and at the same time furnishes an abutment for the peripheral portion 18 of a cover 19 having an overhanging peripheral flange 20, thereby sealing the chamber 21 within the inner container 15. The cover 19 is provided with a knob 22 for ease of handling.

The outer and inner walls 14 and 15 (Figure 1) at the front thereof are bored at two places one above the other, the lower one to receive a window 23 of transparent material secured to the inner wall as at 24 and having a converging window frame 25 of approximately rectangular outline. The purpose of the window 23 is to enable the operator to see the amount of butter remaining in the machine and thus to determine when the machine requires replenishment. Immediately above the window 23 the walls 14 and 15 are bored in a second place to receive a temperature indicator 26, such as a thermometer, in order to indicate the temperature within the chamber 21.

The outer wall 14 is secured as at 27 to the top wall 28 of the base casing 11, which also is provided with a plurality of tubular spacers 29 (Figure 3) arranged at intervals in a circular path, by which the bottom wall 30 of the inner container 15 is mounted upon the top wall 28 of the base casing 11. At the front of the machine the walls 28 and 30 are held in this spaced relationship by hollow screws 31 inserted through aligned apertures 32 and 33 (Figure 3) and locked in assembly by nuts 34. At the rear of the machine (Figure 1) the same function is performed by similar tubular spacers 35 held between the walls 28 and 30 by solid screws 36 and nuts 37.

Butter slicing and marking mechanism

The heads of the screws 36 are provided with rounded recesses 38 which receive the rounded lower ends of studs 39, the heads 40 of which are secured to the underside of a material support or abutment in the form of an annular plate 41 which is thereby spaced vertically from the bottom wall 30 of the inner container 15 (Figure 1). At one side of the machine, the annular plate 41 is provided with a step 42 (Figures 1 and 2) by which it descends from a higher level portion 43 to a lower level portion 44. The lower level portion 44 extends about one quarter of the circumference of the plate 41, and is provided with an arcuate groove 45, which is open at its forward end and which serves to protect the bottom of the block or print of butter after it has been imprinted with a design or insigne, as explained below.

Figure 2:
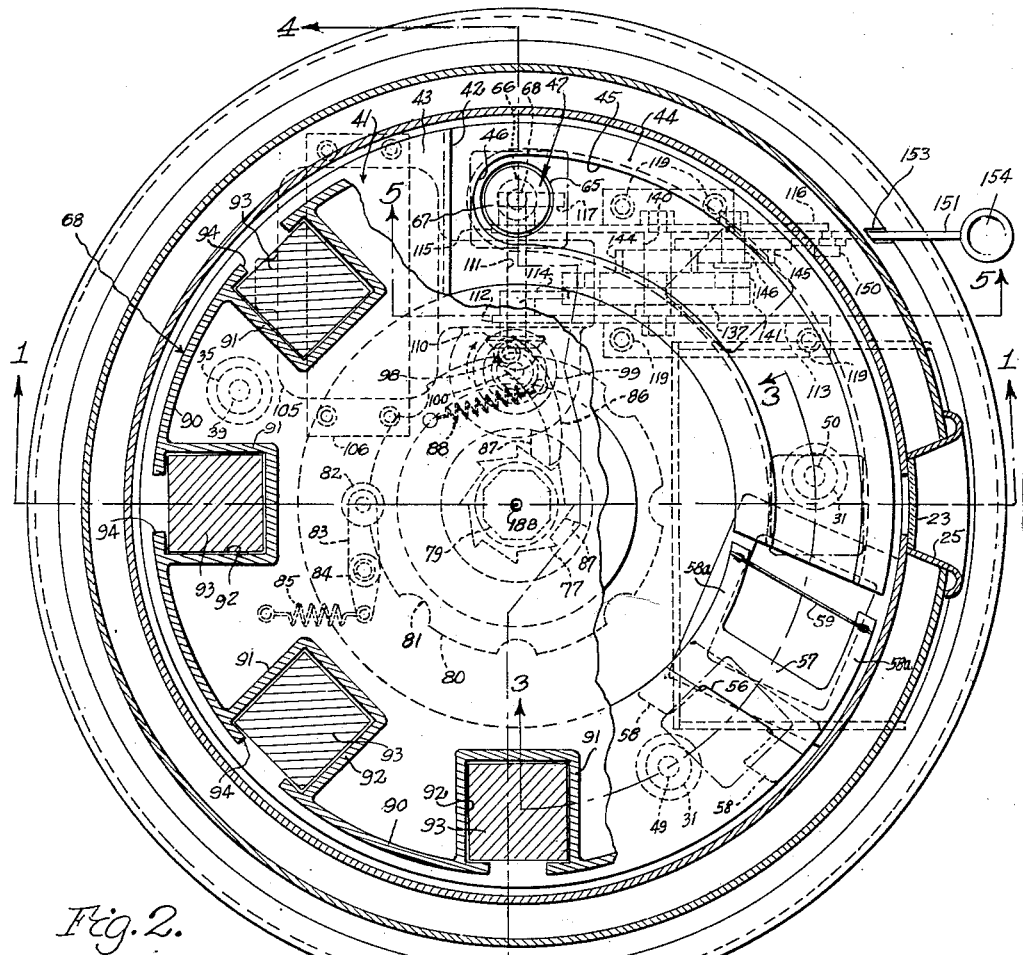
Figure 2 is a horizontal section taken along the line 2—2 in Figure 1, with the right-hand portion of the rotary magazine broken away to disclose the imprinting and slicing mechanism beneath it.

The rearward end 46 of the groove 45 adjacent the step 42 is closed and of semi-circular outline, and receives the head of the marking plunger 47 which is mounted for vertical reciprocation at that point (Figures 2 and 4). At that point, the walls 28 and 30 are separated by a spacer 29, hollow screw 31 and nut 34 similar to those provided at the front of the machine (Figure 3) and previously described. Each of these hollow screws 31 is provided with a vertical bore 48 for accommodating a vertical reciprocating member for one purpose or another. The two hollow screws 31 at the front of the machine (Figure 3) serve to receive adjusting plungers 49 and 50 respectively secured to the high level end 51 and low level end 52 of the annular plate 41. The upper end of the plunger 50 is reduced in diameter and is secured in a hole 53 in a boss 54 on the end 52.

The end 51 of the annular plate 41 is provided with a tongue 55 which fits through a slot 56 in a swinging U-shaped frame 57. The frame 57 has wings 58 engaging beneath the end to cooperate with the tongue 55 and prevent downward pivotal movement of the frame 57, and also has forwardly extending arms 58a. The frame 57, however, is free to swing upward. Stretched between the arms 58a of the frame 57 is a butter-slicing wire 59, the ends of which are secured as by welding or soldering to the ends of the arms 58a. The height of the wire 59 above the end 52 of the low level portion 44 of the annular plate 41 determines the thickness of the butter pat which is sliced off the lower end of the butter print or block. In order to adjust this height and therefore vary the thickness of the butter pat to be cut, the adjusting plungers 49 and 50 have rounded lower ends which are received in sockets 60 in the center of adjusting thumb nuts 61 and 62 (Figure 3) threaded upon the lower ends of the hollow screws 31. Then turning the thumb nuts 61 and 62, the ends 51 and 52 may be raised or lowered so as to vary the spacing of the end 52 from the butter slicing wire 59, and therefore vary the thickness of the pat to be cut.

The bore 48 of the hollow screw 31 at the side of the machine immediately adjacent the step 42 serves to receive the stem 63 of the marking plunger 47 (Figure 4) which is encircled by a coil spring 64 to urge the plunger 47 downward into a hole 65 in the groove 45. The stem 63 is provided at its lower end with a head 66 and at its upper end with a head 67 provided with a suitable design or trade-mark in relief thereon. The mechanism for reciprocating the stem 63 of the marking plunger 47 in timed relationship with the remainder of the mechanism is described later therein.

Magazine construction

To rotatably support the rotary magazine or material holder, generally designated 68 which contains the blocks or prints of butter to be sliced into pats and dispensed, the central portions of the walls 28 and 30 are apertured to receive a cup-shaped downwardly-extending bearing member 69 and annular retaining ring 70 respectively, the latter being secured to the former by screws 71 (Figure 4). The outer flanged portion 72 of the bearing member 69 extends between the bottom walls 30 and 28 and serves as a spacer thereof. The portion 72 is provided with an annular socket 73 for receiving the retaining ring 70.

The bearing member 69 is provided with a vertical bore 74 in which is journaled an approximately cylindrical member 75 provided with an annular recess 76 containing a ratchet 77. The member 75 is provided with a vertical bore 78 of polygonal cross-section which receives a stem 79 of corresponding polygonal cross-section extending downward from the hub portion 80 of the magazine 68. The hub portion 80 is approximately circular with peripherally spaced notches 81 (Figures 1 and 2) which serve to yieldingly receive a detent roller 82 for yielding positioning the magazine 68 in a series of predetermined positions.

The detent roller 82 is rotatably mounted upon the end of a lever 83 which is pivotally mounted upon a pivot screw 84, the roller 82 being yieldingly urged into the notches 81 by a coil spring 85 attached to the opposite end of the lever 83 (Figure 2). The magazine 68 is rotated step by step by means of a pawl 86 engaging the ratchet 77, this pawl 86 passing through a slot 87 (Figure 4) in the cup-shaped bearing member 69. The pawl 86 is urged into engagement with the ratchet 77 by a coil spring 88.

The magazine 68 is of approximately cylindrical form with a bottom wall 89 and a side wall 90 rising therefrom. The side wall 90 is provided at intervals around the periphery thereof with inwardly extending vertical chutes 91 having vertical passageways 92, preferably of approximating square cross-section (Figure 2) for slidably receiving the prints or blocks of butter 93. The latter are shown as being of the usual standard dimensions, such as for example, for a quarter pound print. It will be obvious, however, that the chute passageways 92 may be of circular or of any other shape, depending upon the shape of butter pat desired, and upon the shape of the butter print 93 supplied thereto. The chutes 91 are provided with vertical peripheral slots 94 through which the amount of butter remaining in the chutes 91 is made visible to an observer looking through the window 23 in the front of the machine (Figure 1). The chutes 91 and side wall 90 of the magazine 68 form a continuous closed wall around the periphery of the magazine, enclosing a chamber 95 in the center of the magazine.

The chamber 95 serves as a receptacle for additional prints 93 of butter for replenishment purposes and may also contain ice, dry ice, or other cooling means. Alternatively, cooling may be more accurately accomplished by a mechanical refrigerating unit generally designated 96 (Figure 7) attached to the back of the machine or other suitable portion, such as the hollow base 11, and connected to a cooling coil or evaporator 97 preferably passing through the space between the outer and inner walls 14 and 15. Electric current for actuating the refrigerating unit 96 is supplied by an electric conductor cable 97 connected to a current outlet, such as an ordinary house wiring outlet. The refrigerating unit 96 is conventional and its details form no part of the present invention.

Magazine rotating and indexing mechanism

The magazine is rotated step by step and indexed from station to station by motor driven mechanism which reciprocates the pawl 86 and stem 63 of the marking plunger 47 in timed relationship (Figure 4). The pawl 86 is pivotally mounted upon a crank pin or stud screw 98, which in turn is eccentrically mounted upon a disc 99 secured to the upper end of a vertical shaft 100, the lower end of which is journaled in a gear housing 101 and carries a worm wheel 102. Meshing with the worm wheel 102 is a worm 103 on the armature shaft 104 of an electric motor 105, the base 106 of which is bolted to a mounting block 107. The latter is secured by the screws 108 to the underside of the top wall 28 of the base housing or casing 11 (Figure 1).

For the purpose of reciprocating the marking plunger 47 in timed relationship, the shaft 100 also carries a bevel gear 109 meshing with a bevel gear 110 (Figure 4) on the end of a horizontal shaft 111. The latter is journaled in an arm portion 112 extending laterally from a plate 113 described hereinafter in more detail, and beyond the plate arm 112 carries the hub of a rotary cam finger 114 which operates the switch-setting mechanism described below. At its outer end, the shaft 111 is journaled in the arm portion 115 of a second plate 116 parallel to the plate 113 and carries the hub of a second rotary cam finger 117 of approximately crescent shape. The cam finger 117 in rotating engages the lower head 66 on the marking plunger stem 63 and reciprocates it vertically in timed relationship with the reciprocation of the pawl 86 which rotates the magazine 68 step by step through its engagement with the ratchet 77.

Control mechanism

The control mechanism generally designated 118 (Figures 5 and 6) by which the energization of the motor 105 is controlled is mounted upon the two plates 113 and 116 previously described which in turn are bent at right angles and secured by the screws 119 to the underside of the top wall 28 of the base housing 11. Mounted between the lower ends of the plates 113 and 116 and secured thereto by the screws 120 is an electric motor control switch 121 of conventional type having a spring-urged operating plunger 122 for opening and closing the circuit between terminals or binding posts 123 and 124 on the lower side of the switch 121. The motor 105 is energized by conductors 125 and 126, the former emerging from a cable 127 which also carries a conductor 128. The conductors 126 and 128 are connected respectively to the switch terminals 123 and 124 (Figure 1).

The switch plunger 122 is reciprocated in order to electrically interconnect or disconnect the switch terminals 123 and 124 by a rocking lever 129 which is provided with ears 130 pivotally mounted upon a pivot pin 131 which in turn is supported by ears 132 extending upward from the top of the switch 121. The opposite end of the rocking lever 129 is provided with upwardly extending ears 133 carrying an axle 134 which rotatably supports a roller 135. The roller 135 is urged upward by a compression coil spring 136 arranged between the top of the switch 121 and the rocking lever 129.

Mounted in the plane of rotation of the rotary finger 114 so as to be actuated thereby, is a multi-lobed rotary cam 137 having tooth-like projections 138 alternating with depressions or troughs 139. The rotary cam 137 is loosely and rotatably mounted upon a pivot bolt 140 secured to and extending between the parallel plates 113 and 116. Rigidly connected to the rotary cam 137 so as to move in unison therewith, is a second multi-lobed rotary cam 141 having lobes 142 provided with arcuate notches 143 curved to receive the roller 135 carried by the rocking lever 129.

Also secured to the rotary cams 137 and 141 for the purpose of manually rotating them is a gear 144 which meshes with a gear 145 loosely and rotatably mounted on a pivot bolt 146, which in turn is mounted on the plate 116. Pinned as at 147 to rotate in unison with the gear 145 is a ratchet wheel 148, the teeth of which are engaged by a pawl 149 pivotally mounted on a pin 150 carried by a manually operable lever 151. The lower end of the lever 151 is pivotally mounted upon the pivot bolt or stud 146 and at its opposite end passes through a slot 153 in the base housing 11 and terminates in a key or button 154 (Figure 1). In order to urge the pawl 149 into engagement with the teeth of the ratchet 148, the latter is in the form of a bell-crank having a pin 155 connected to a coil spring 156 which in turn is anchored to a pin 157 carried by an upwardly projecting arm portion 158 of the lever 151. In order to urge the lever 151 upward, the second coil spring 159 is anchored at one end to the pin 157 and at the other end to a pin 160 carried by the plate 116. The swinging of the lever 151 is limited by stop pins 161 and 162 respectively mounted at the top and midportion of the plate 116.

Butter-receiving structure

Figure 3:
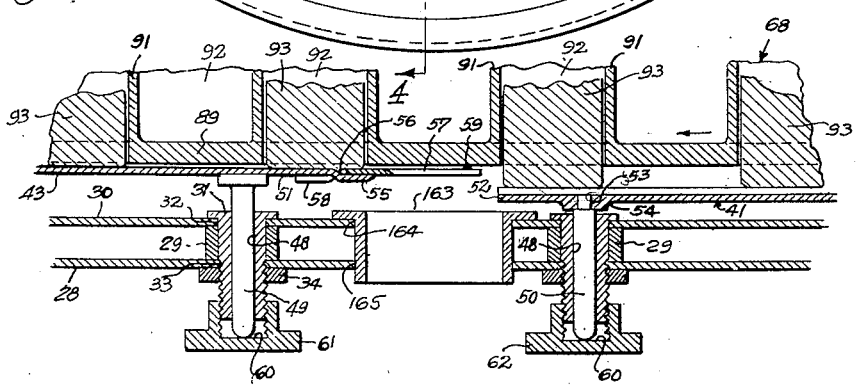
Figure 3 is a fragmentary developed vertical section through the slicing and delivery portion of the machine, taken along the arcuate line 3—3 in Figure 2.

The pats of butter sliced off the bottom of the prints 93 are enable to drop downward through a flanged outlet chute 163 mounted in vertically aligned apertures 164 and 165 in the walls 28 and 30 (Figure 3). After passing through the chute 165, the butter pat drops either into the hand of the operator, or onto a plate or dish inserted through an access opening 166 in the front of the base housing 11 or drops directly upon a shelf or floor plate 167 having an edge flange 168 partially surrounding it. The magazine 68 is provided with a central vertical passageway 188 extending downward through the stem 79 for drainage purposes.

Operation

In the operation of the invention, the cover 19 is lifted off and the chutes 91 are filled with blocks or prints of butter, after which the cover is replaced. In order to properly preserve the butter, it is preferable that some means of cooling the butter is provided, but, as previously stated, the refrigerating system such as that shown at 96 and 97 in Figure 7 forms no part of the present invention. It is also preferable to maintain the contents of the magazine 68 within a predetermined temperature range in order that the butter will be of the proper consistency to be sliced without being either too hard or too soft. The thermometer 26 enables the operator to check the temperature at frequent intervals and therefore to maintain the proper temperature.

The electrical conductors 125 and 128 are energized by connecting them to an electric current outlet, and let it be assumed that the plungers 49 and 50 (Figure 3) have been adjusted by turning the thumb nuts 60 and 62 until the butter slicing wire 59 is at the proper height above the end 52 of the annual plate 41 to slice pats of the desired thickness off the bottoms of the butter prints 93. The machine is now ready for operation, and the parts are in the positions shown in Figure 1, with the switch 121 open.

To operate the machine and slice a pat of butter off a print or block 93 the operator places his finger upon the button 154 and pushes down the lever 151 in the slot 153 as far as it will go, as regulated by the stop pin 162. This action engages the pawl 149 with the ratchet 148 and rotates the latter a partial revolution by pushing the ratchet tooth downward as far as it will go, whereupon it occupies the position adjacent the head of the arrow in Figure 5. From Figure 5 it will be seen that even if the operator depresses the push button 154 and lever 151 again, it will temporarily have no further effect on rotating the ratchet 148 and the mechanism connected thereto because the pawl 149 will merely slide along the back of the preceding ratchet tooth without engaging the step of the tooth itself. This prevents the operator from interfering with the operating cycle once he has started it in operation, such as by redepressing the push button 154 repeatedly after depressing it the first time. Consequently, the carrying-out of a complete operating cycle is assured, thereby preventing the carrying-out of a partial operating cycle which might leave the butter pat only partially sliced off the bottom of the block or print 93. When the operator releases the push-button 154, the spring 159 returns the lever 151 to its upper position, leaving the parts in the position shown in Figure 5.

The partial rotation of the ratchet 148 rotates the gear 145 which is pinned to it, and consequently rotates the gear 144 an equal amount in the opposite direction, thereby rotating the rotary cams 137 and 141. The rotation of the cam 141 (Figure 5) causes the roller 135 to roll down from the notch 143 of a lobe 142 into the trough or valley between the lobes 142. This releases the rocking lever 129 and causes it to be rocked by the coil spring 136 so as to depress the switch plunger 122 and close the electric circuit between the terminals 123 and 124. This action energizes the motor 105 and consequently rotates the shafts 100 and 111 geared to the motor armature shaft 104 (Figure 4). The rotation of the shaft 100 and of the disc 99 causes the pawl 80 to engage the ratchet 77 and rotate the octagonal shaft 79 and the magazine 68 from one station to another. As the magazine 68 thus rotates through a partial revolution, the butter print which is nearest the chute 163 (Figure 3) is moved in an arcuate path past the slicing wire 59 into the position shown by the next butter print 93 immediately to the left of the chute, causing a butter pat to be sliced off the bottom of the print 93, the freshly cut new bottom of which comes to rest on the end 51 of the higher level portion 43 of the annular plate 41. Meanwhile, the butter pat, thus severed, drops through the chute 163 into a suitable receptacle and is removed by the operator.

Meanwhile, the rotation of the shaft 111 by the motor 105 (Figure 4) has also swung the cam fingers 114 and 117 thereon through an arcuate path. The swinging of the finger 114 causes its rounded end to engage the tooth 138 of the rotary cam 137 and rotate the cam 137 through a partial revolution. This in turn rotates the cam 141 through a partial revolution sufficient to cause its nearest lobe 142 to engage and push down the roller 135 into one of the notches 143. This causes the rocking lever 129 to swing from the position of Figure 5 to that of Figure 1, permitting the spring-urged switch plunger 122 to move upward and open the circuit to the motor 105. The opening of the switch 121 halts the motor 105 and leaves the parts in the positions shown in Figure 1, ready for the start of a new butter dispensing cycle.

While the motor has been moving the shaft 100 and 111 through the foregoing cycle, however, the consequent swinging of the cam finger 107 has in the meantime engaged the lower head 66 and pushed it upward, causing the upper head 67 of the marking plunger 47 to move upward through the aperture 65 into engagement with the bottom of the butter print 93 which momentarily happens to be over the plunger 47. This action impresses a trade-mark or design upon the bottom of the butter print 93, the edges of which rest upon the edges of the low level plate portion 44 outside the groove 45. The imprinting action of course takes place during the second half of the rotation of the shaft 100 (Figure 4) after the pawl 80 has advanced the magazine 68 by one station and is being retracted to its previous position. At the end of each cycle the detent roller 82 slips into one of the notches 81 (Figures 1 and 2) to accurately position the magazine 68.

In the foregoing manner, the motor 105 when energized by the control mechanism 118 causes the machine to execute a single operating cycle as described above, resulting in the slicing off of a butter pat from the bottom of the nearest butter print 93 and at the same time imprinting the trade-mark or other design on the bottom of the butter pat which is approaching the cut off point. The action of the rotary cam finger 114 upon the cam 137 returns the ratchet 148 to a position where one of its teeth is within the reach of the pawl 149 when the operator next depresses the push button 154 on the lever 151 to dispense another pat of butter.

The operator repeats the foregoing operations as often as necessary, causing the motor 105 and its accompanying mechanism to index the magazine 68 from station to station so as to slice off a pat of butter each time the push button 154 is depressed providing that the push button 154 is not depressed too quickly while an operating cycle is still in progress as explained above. In this manner the machine of the present invention dispenses pats of butter quickly and efficiently in any quantity desired. When the operator sees through the window 23 and slots 94 that the supplies of butter in the chutes 91 are nearing exhaustion he removes the cover 19 and refills the chutes 91 with butter. The magazine 68 may be easily lifted out of the machine for thorough cleaning if it is desired to do so. It can be acurately replaced in registry with its former position because of the polygonal shaft or stem 79 fitting into the corresponding polygonal bore 78.

What I claim is:

1. A machine for dispensing pieces of butter-like material from blocks thereof, comprising a supporting structure having a butter pat outlet opening therein, a material holder on said structure having a passageway slidably receiving said block, a material cutter arranged adjacent said outlet opening, feed mechanism for moving said holder and said cutter relatively to one another to sever pieces of material from a block thereof, a material marking member mounted adjacent said holder, and devices operable in timed relationship with said feed mechanism for moving said member and said block into mutual engagement upon the arrival of said passageway at said marking member.

2. A machine for dispensing pieces of butter-like material from blocks thereof, comprising a supporting structure having a butter pat outlet opening therein, a material holder on said structure having a passageway slidably receiving said block and movable into registry with said outlet opening, a material cutter arranged adjacent said outlet opening, a motor feed mechanism drivingly connecting said motor to said holder for moving said holder and said cutter relatively to one another to sever pieces of material from a block thereof, a motor energization switch in circuit with said motor, and switch operating mechanism including devices responsive to the initiation of an operating cycle of said feed mechanism for preventing opening of said switch prior to the completion of said cycle.

3. A machine for dispensing pieces of butter-like material from blocks thereof, comprising a supporting structure having a butter pat outlet opening therein, a material holder rotatably mounted on said structure with passageways slidably receiving said blocks and movable into registry with said outlet opening, a material cutter arranged adjacent said outlet opening, feed mechanism for rotating said holder past said cutter for severing pieces from said blocks, and a material marking member mounted adjacent said holder and operatively connected to said feed mechanism for movement into engagement with said blocks.

4. A machine for dispensing pieces of butter-like material from blocks thereof, comprising a supporting structure having a butter pat outlet opening therein, a material holder rotatably mounted on said structure with passageways slidably receiving said blocks and movable into registry with said outlet opening, a material cutter arranged adjacent said outlet opening, feed mechanism for rotating said holder past said cutter for severing pieces from said blocks, and a material marking member mounted adjacent said holder and movable into engagement with said blocks, said mechanism including devices operable in timed relationship therewith for moving said member into engagement with said blocks.

5. A machine for dispensing pieces of butter-like material from blocks thereof, comprising a supporting structure having a butter pat outlet opening therein, a material holder rotatably mounted on said structure with passageways slidably receiving said blocks and movable into registry with said outlet opening, a material cutter arranged adjacent said outlet opening, a motor, feed mechanism drivingly connecting said motor to said holder for rotating said holder past said cutter for severing pieces from said blocks, a motor energization switch in circuit with said motor, and switch operating mechanism including devices responsive to the initiation of an operating cycle of said feed mechanism for preventing opening of said switch prior to the completion of said cycle.

6. A machine for dispensing pieces of butter-like material from blocks thereof, comprising a supporting structure having a butter pat outlet opening therein, a material holder rotatably mounted on said structure with passageways slidably receiving said blocks and movable into registry with said outlet opening, a material cutter arranged adjacent said outlet opening, a motor, feed mechanism drivingly connecting said motor to said holder for rotating said holder past said cutter for severing pieces from said blocks, a material marking member mounted adjacent said holder and movable into engagement with said blocks, said mechanism including devices operable in timed relationship with said feed mechanism for moving said member into engagement with said blocks, a motor energization switch in circuit with said motor, and switch operating mechanism also including devices responsive to the initiation of an operating cycle of said feed mechanism for preventing opening of said switch prior to the completion of said cycle.

7. A machine for dispensing pieces of butter-like material from blocks thereof, comprising a supporting structure having a butter pat outlet opening therein, a material holder rotatably mounted on said structure with passageways slidably receiving said blocks and movable into registry with said outlet opening, a material cutter arranged adjacent said outlet opening, mechanism drivingly connecting said motor to said holder for rotating said holder step-by-step past said cutter for severing pieces from said blocks, a manually-operated motor energization switch, and devices interconnecting said motor energization switch with said feed mechanism and responsive to a starting motion of said switch for preventing opening of said switch during the operating cycle of said feed mechanism prior to the completion of said cycle.

8. A machine for dispensing pieces of butter-like material from blocks thereof, comprising a supporting structure having a butter pat outlet opening therein, a material holder rotatably mounted on said structure with passageways slidably receiving said blocks and movable into registry with said outlet opening, a material cutter arranged adjacent said outlet opening, mechanism for rotating said holder step-by-step past said cutter for severing pieces from said blocks, a material marking member movably mounted adjacent said holder, said mechanism including connections actuating said member in timed relationship with said mechanism, a manually-operated starting element, and devices interconnecting said starting element with said mechanism and responsive to a starting motion of said element for preventing interruption of the operating cycle of said mechanism prior to the completion of said cycle.

THOMAS A. TISCHLER.

REFERENCES CITED

The following references are of record in the file of this patent:

UNITED STATES PATENTS

| Number | Name | Date |
|---|---|---|
| 1,395,978 | Wineland | Nov. 1, 1921 |
| 1,407,759 | Knox | Feb. 28, 1922 |
| 1,807,849 | Kubon | June 2, 1931 |
| 2,122,947 | Lopez | July 5, 1938 |
| 2,153,255 | Knott | Apr. 4, 1939 |